(12) United States Patent
Agarwal et al.

(10) Patent No.: US 11,887,238 B2
(45) Date of Patent: Jan. 30, 2024

(54) METHOD AND SYSTEM FOR GENERATING 2D ANIMATED LIP IMAGES SYNCHRONIZING TO AN AUDIO SIGNAL

(71) Applicant: Tata Consultancy Services Limited, Mumbai (IN)

(72) Inventors: Swapna Agarwal, Kolkata (IN); Dipanjan Das, Kolkata (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 307 days.

(21) Appl. No.: 17/405,765

(22) Filed: Aug. 18, 2021

(65) Prior Publication Data

US 2022/0058850 A1 Feb. 24, 2022

(30) Foreign Application Priority Data

Aug. 23, 2020 (IN) .............................. 202021036263

(51) Int. Cl.
   *G06T 13/80* (2011.01)
   *G06V 40/16* (2022.01)
   (Continued)

(52) U.S. Cl.
   CPC ............ *G06T 13/80* (2013.01); *G06F 18/214* (2023.01); *G06F 18/253* (2023.01); *G06V 10/40* (2022.01);
   (Continued)

(58) Field of Classification Search
   CPC ....... G06T 13/80; G06V 40/171; G06V 10/40; G06F 18/253; G06F 18/214; G06N 3/02;
   (Continued)

(56) References Cited

U.S. PATENT DOCUMENTS 10,658,005 B1  5/2020  Bogan, III et al.
2023/0074979 A1* 3/2023  Brehmer .............. H04N 19/426

OTHER PUBLICATIONS

A. Koumparoulis, G. Potamianos, S. Thomas and E. da Silva Morais, "Audio-Assisted Image Inpainting for Talking Faces," ICASSP 2020-2020 IEEE International Conference on Acoustics, Speech and Signal Processing (ICASSP), Barcelona, Spain, Apr. 5, 2020, pp. 7664-7668, doi: 10.1109/ICASSP40776.2020.9053184 (Year: 2020).*

(Continued)

*Primary Examiner* — Antonio A Caschera
(74) *Attorney, Agent, or Firm* — FINNEGAN, HENDERSON, FARABOW, GARRETT & DUNNER, LLP (57) ABSTRACT

A method and system for generating 2D animated lip images synchronizing to an audio signal for an unseen subject. The system receives an audio signal and a target lip image of an unseen target subject as inputs from a user and processes these inputs to extract a plurality of high dimensional audio image features. The lip generator system is meta-trained with training dataset which consists of large variety of subjects' ethnicity and vocabulary. The meta-trained model generates realistic animation for previously unseen face and unseen audio when finetuned with only a few-shot samples for a predefined interval of time. Additionally, the method protects intrinsic features of the unseen target subject.

9 Claims, 8 Drawing Sheets

(51) Int. Cl.
  *G06V 10/40* (2022.01)
  *G10L 15/02* (2006.01)
  *G10L 19/00* (2013.01)
  *G06F 18/214* (2023.01)
  *G06F 18/25* (2023.01)
(52) U.S. Cl.
  CPC ............ *G06V 40/171* (2022.01); *G10L 15/02* (2013.01); *G10L 19/00* (2013.01)
(58) Field of Classification Search
  CPC ...... G06N 3/0455; G06N 3/08; G06N 3/0985; G10L 15/02; G10L 19/00
  See application file for complete search history.

(56) References Cited

OTHER PUBLICATIONS

Klejch, Ondřej et al., "Speaker Adaptive Training using Model Agnostic Meta-Learning", Audio and Speech Processing, Oct. 2019, Arxiv, https://arxiv.org/pdf/1910.10605.pdf.
Zakharov[1,2], Egor et al., "Few-Shot Adversarial Learning of Realistic Neural Talking Head Models", Machine Learning, Sep. 2019, Arxiv, https://arxiv.org/pdf/1905.08233.pdf.
Suwajanakorn, Supasorn et al., "Synthesizing Obama: Learning Lip Sync from Audio", Transaction Graphics, Jul. 2017, vol. 36, Issue: 4, ACM, https:/grail.cs.washington.edu/projects/AudioToObama/siggraph17_obama.pdf.

* cited by examiner

METHOD AND SYSTEM FOR GENERATING 2D ANIMATED LIP IMAGES SYNCHRONIZING TO AN AUDIO SIGNAL

PRIORITY CLAIM

This U.S. Patent application claims priority under 35 U.S.C § 119 to Indian patent application no. 202021036263, filed on Aug. 23, 2020. The entire contents of the aforementioned application are incorporated herein by reference.

TECHNICAL FIELD

The disclosure herein generally relates to animating images with audio signal, and, more particularly, to method and system for generating 2D animated lip images synchronizing to an audio signal.

BACKGROUND

In multimedia communication, audio and video synchronization plays a major role in speech recognition and animation. Lip synchronization refers to the relative temporal distinction between the audio and image during transmission and reception. Recent advances in convolutional neural network based approaches generate convincing talking heads. The current State-Of-the-Art (SOA) speech driven models generalize talking heads at one time by training deep neural network with huge training datasets comprising of multiple subjects. With such trainings it is difficult to produce faithful rendering of lip movement on a target unseen face image. Also, there are methods to train the personalized network with huge training datasets samples with the target face only. However, training such models is very time consuming and requires huge training datasets for each of the target faces.

In one existing method, recurrent neural network predicts the mouth shape for every frame of the audio and uses separate network to generate texture for the predicted mouth shape. These methods lack generalization as these methods require retraining the entire model with hours or minutes of video of other subjects. In another method, generating realistic animation of the unseen target subject face without retraining the model can be applied to an arbitrary subject. This method generates face sequences but limits in providing clarity images thereby resulting blurry and not temporally meaningful images, and the generated lips move even when there is no utterance.

SUMMARY

Embodiments of the present disclosure present technological improvements as solutions to one or more of the above-mentioned technical problems recognized by the inventors in conventional systems. For example, in one embodiment, a system for generating 2D animated lip images synchronizing to an audio signal is provided. The system includes receiving by a lip generator system, an audio signal and a target lip image of an unseen target subject as inputs from a user. The lip generator system is trained using a meta learning based model agnostic technique, wherein the lip generator system comprises a meta trained and finetuned audio encoder, a meta trained and finetuned image encoder and a meta trained and finetuned decoder, where each 2D animated lip image is synchronized to the input audio signal. The meta trained and finetuned audio encoder extracts a plurality of high dimensional audio features from the input audio signal and the meta trained and finetuned image encoder extracts a plurality of high dimensional image features from the target lip image. The method generates a plurality of high dimensional audio image features by fusing the plurality of high dimensional audio features with the plurality of high dimensional image features. Further, the meta trained and finetuned decoder generates a plurality of 2D animated lip images of the unseen target subject to synchronize with the input audio signal based on the plurality of high dimensional audio image features serving as an input to the meta trained and finetuned decoder.

In one embodiment, training the lip generator system using the meta learning based model agnostic technique comprises by performing meta learning, on a training dataset comprising a plurality of data, wherein each data from the plurality of data constitutes a subject's lip image and the audio signal as input, and the corresponding subject's sequence of lip images synchronized with the input audio signal as output, wherein the plurality of data is splitted into a plurality of episodes. Further, the system iteratively, performs for every episode from the plurality of episodes for the training dataset samples by splitting, each episode into a predefined number of tasks among a plurality of tasks, wherein each task consists of a predefined number of training data samples and a predefined number of test data samples corresponding to one subject. Then initializes one or more fast weights and one or more global weights, wherein the one or more features corresponding to each individual subject are learnt using the one or more fast weights. The one or more global weights are updated based on the one or more fast weights for global representation of the one or more features for the training dataset corresponding to all the subjects. Further, the one or more global weights are copied into the one or more fast weights and then the one or more fast weights are updated using a gradient descent technique for training dataset samples corresponding to one randomly selected task among the plurality of tasks. The loss of the test data samples is determined corresponding to the subject of the task with respect to the one or more fast weights. Performs, for each task, the steps of: (a) copying, the global weights into the fast weights, (b) updating, the one or more fast weights using a gradient descent technique on training dataset samples corresponding to one randomly selected task among the plurality of tasks, and (c) determining, the loss corresponding to the test data samples of the task based on the one or more fast weights. Further the one or more global weights are updated based on the loss accumulated based on the plurality of tasks.

In another aspect, a method for generating 2D animated lip images synchronizing to an audio signal is provided. The method includes receiving by a lip generator system, an audio signal and a target lip image of an unseen target subject as inputs from a user. The lip generator system is trained using a meta learning based model agnostic technique, wherein the lip generator system comprises a meta trained and finetuned audio encoder, a meta trained and finetuned image encoder and a meta trained and finetuned decoder, where each 2D animated lip image is synchronized to the input audio signal. The meta trained and finetuned audio encoder extracts a plurality of high dimensional audio features from the input audio signal and the meta trained and finetuned image encoder extracts a plurality of high dimensional image features from the target lip image. The method generates a plurality of high dimensional audio image features by fusing the plurality of high dimensional audio features with the plurality of high dimensional image features. Further, the meta trained and finetuned decoder generates a plurality of 2D animated lip images of the unseen target subject to synchronize with the input audio signal based on the plurality of high dimensional audio image features serving as an input to the meta trained and finetuned decoder.

In one embodiment, training the lip generator system using the meta learning based model agnostic technique comprises by performing meta learning, on a training dataset comprising a plurality of data, wherein each data from the plurality of data constitutes a subject's lip image and audio signal as input, and the corresponding subject's sequence of lip images synchronized to the input audio signal as output, wherein the plurality of data is splitted into a plurality of episodes. Further, the system iteratively, performs for every episode from the plurality of episodes for the training dataset samples by splitting, each episode into a predefined number of tasks among a plurality of tasks, wherein each task consists of a predefined number of training data samples and a predefined number of test data samples corresponding to the subject. Then initializes one or more fast weights and one or more global weights, wherein the one or more features corresponding to each individual subject are learnt using the fast weights. The one or more global weights are updated based on the one or more fast weights for global representation of the one or more features for the training dataset corresponding to all the subjects. Further, the one or more global weights are copied into the one or more fast weights and then the one or more fast weights are updated using a gradient descent technique for training dataset samples corresponding to one randomly selected task among the plurality of tasks. The loss of the test data samples is determined corresponding to the subject of the task based on the one or more fast weights. Performs, for each task the steps of: (a) copying, the one or more global weights into the one or more fast weights, (b) updating, the one or more fast weights using a gradient descent technique on training data samples corresponding to one randomly selected task among the plurality of tasks, and (c) determining, the loss corresponding to the test data samples of the task based on the one or more fast weights. Further, the global one or more weights are updated based on the loss accumulated based on the plurality of tasks.

In yet another aspect, provides one or more non-transitory machine readable information storage mediums comprising one or more instructions, which when executed by one or more hardware processors perform actions includes receiving by a lip generator system, an audio signal and a target lip image of an unseen target subject as inputs from a user. The lip generator system is trained using a meta learning based model agnostic technique, wherein the lip generator system comprises a meta trained and finetuned audio encoder, a meta trained and finetuned image encoder and a meta trained and finetuned decoder, where each 2D animated lip image is synchronized to the input audio signal. The meta trained and finetuned audio encoder extracts a plurality of high dimensional audio features from the input audio signal and the meta trained and finetuned image encoder extracts a plurality of high dimensional image features from the target lip image. The method generates a plurality of high dimensional audio image features by fusing the plurality of high dimensional audio features with the plurality of high dimensional image features. Further, the meta trained and finetuned decoder generates a plurality of 2D animated lip images of the unseen target subject to synchronize with the input audio signal based on the plurality of high dimensional audio image features serving as an input to the meta trained and finetuned decoder.

In one embodiment, training the lip generator system using the meta learning based model agnostic technique comprises by performing meta learning, on a training dataset comprising a plurality of data, wherein each data from the plurality of data constitutes a subject's lip image and audio signal as input, and the corresponding subject's sequence of lip images synchronized to the input audio signal as output, wherein the plurality of data is splitted into a plurality of episodes. Further, the system iteratively, performs for every episode from the plurality of episodes for the training dataset samples by splitting, each episode into a predefined number of tasks among a plurality of tasks, wherein each task consists of a predefined number of training data samples and a predefined number of test data samples corresponding to the subject. Then initializes one or more fast weights and one or more global weights, wherein the one or more features corresponding to each individual subject are learnt using the fast weights. The one or more global weights are updated based on the one or more fast weights for global representation of the one or more features for the training dataset corresponding to all the subjects. Further, the one or more global weights are copied into the one or more fast weights and then the one or more fast weights are updated using a gradient descent technique for training dataset samples corresponding to one randomly selected task among the plurality of tasks. The loss of the test data samples is determined corresponding to the subject of the task based on the one or more fast weights. Performs, for each task the steps of: (a) copying, the one or more global weights into the one or more fast weights, (b) updating, the one or more fast weights using a gradient descent technique on training data samples corresponding to one randomly selected task among the plurality of tasks, and (c) determining, the loss corresponding to the test data samples of the task based on the one or more fast weights. Further, the global one or more weights are updated based on the loss accumulated based on the plurality of tasks.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provides a method and system for generating 2D animated lip images synchronizing to an audio signal for unseen subjects. The method disclosed is a trained meta learning based model agnostic technique to generate 2D animated lip images for unseen subjects. The system or alternatively referred as a lip generator system enables generating realistic 2D animated lip images for an unseen target subject synchronizing with the audio signal. The system is finetuned with limited training dataset samples corresponding to the unseen target subject within predefined interval of time. Further, the lip generator system comprises a meta trained and finetuned audio encoder, a meta trained and finetuned image encoder and a meta trained and finetuned decoder. The meta learning based model agnostic technique is capable of quickly learning new task from a limited number of training datasets, wherein the training datasets includes a plurality of subject's lip images. The present disclosure results in providing better encoding of the audio using deep speech features rather than Log-amplitude Mel-frequency Spectrum (LMS) features of the audio signal as one of the inputs enabling to generate accurate 2D animated images of the target subject. The lip generator system provides better rendering on arbitrary faces by finetuning for very short time as 180 sec using only few samples of the unseen target subject.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

Figure 1:
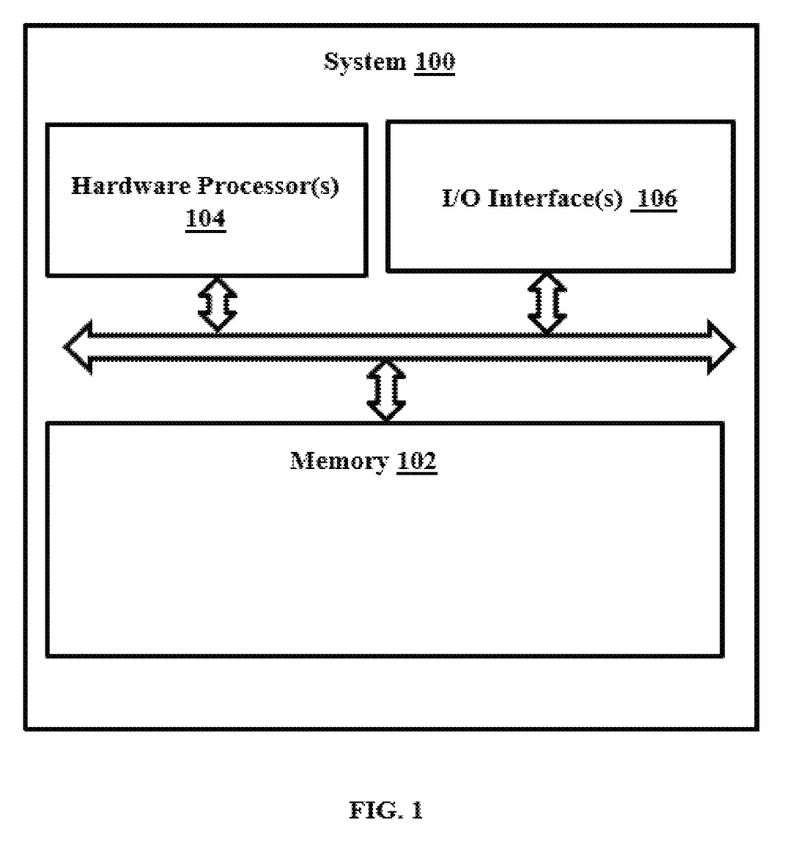
FIG. 1 illustrates an exemplary block diagram of a system (alternatively referred as lip generation system), in accordance with some embodiments of the present disclosure.

FIG. 1 illustrates an exemplary lip generator system implemented for generating 2D animated lip images synchronizing to an audio signal, according to some embodiments of the present disclosure.

In an embodiment, the arrival time prediction system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 comprises a plurality of modules 108 such as arrival time predictor module 110, a historical database 112 and a reward engine 114 and so on, to implement the functions generating 2D animated lip images synchronizing to the audio signal using the system 100.

Figure 2:
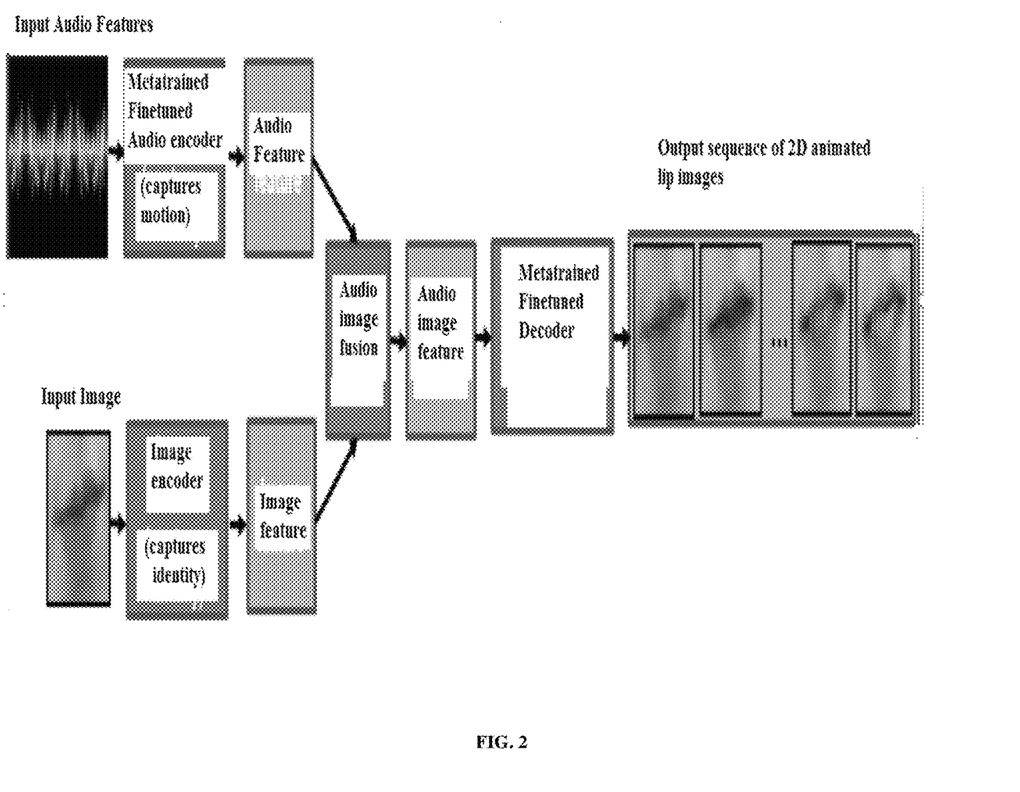
FIG. 2 illustrates a high-level architectural overview of the lip generation system trained using a meta learning based model agnostic technique, according to some embodiments of the present disclosure.

FIG. 2 illustrates a high-level architectural overview of the lip generator system trained using a meta learning based model agnostic technique, according to some embodiments of the present disclosure. FIG. 2 is the lip generator system 100 comprising the meta trained and finetuned audio encoder, the meta trained and finetuned image encoder and the meta trained and finetuned decoder. The system 100 receives an audio signal and a target lip image of an unseen target subject as inputs from a user for generating a plurality of 2D animated lip images of the unseen target subject. The meta trained and finetuned audio encoder extracts audio signal features from the audio signal. The meta trained and finetuned image encoder extracts image features from the target lip image.

Further, the memory 102 may comprise information pertaining to input(s)/output(s) of each step performed by the processor(s) 104 of the system 100 and methods of the present disclosure. Functions of the components of system 100, for generating 2D animated lip images synchronizing to the audio signal, are explained in conjunction with FIG. 3 through FIG. 8 providing flow diagram, architectural overviews, and performance analysis of the system 100.

Figure 3:
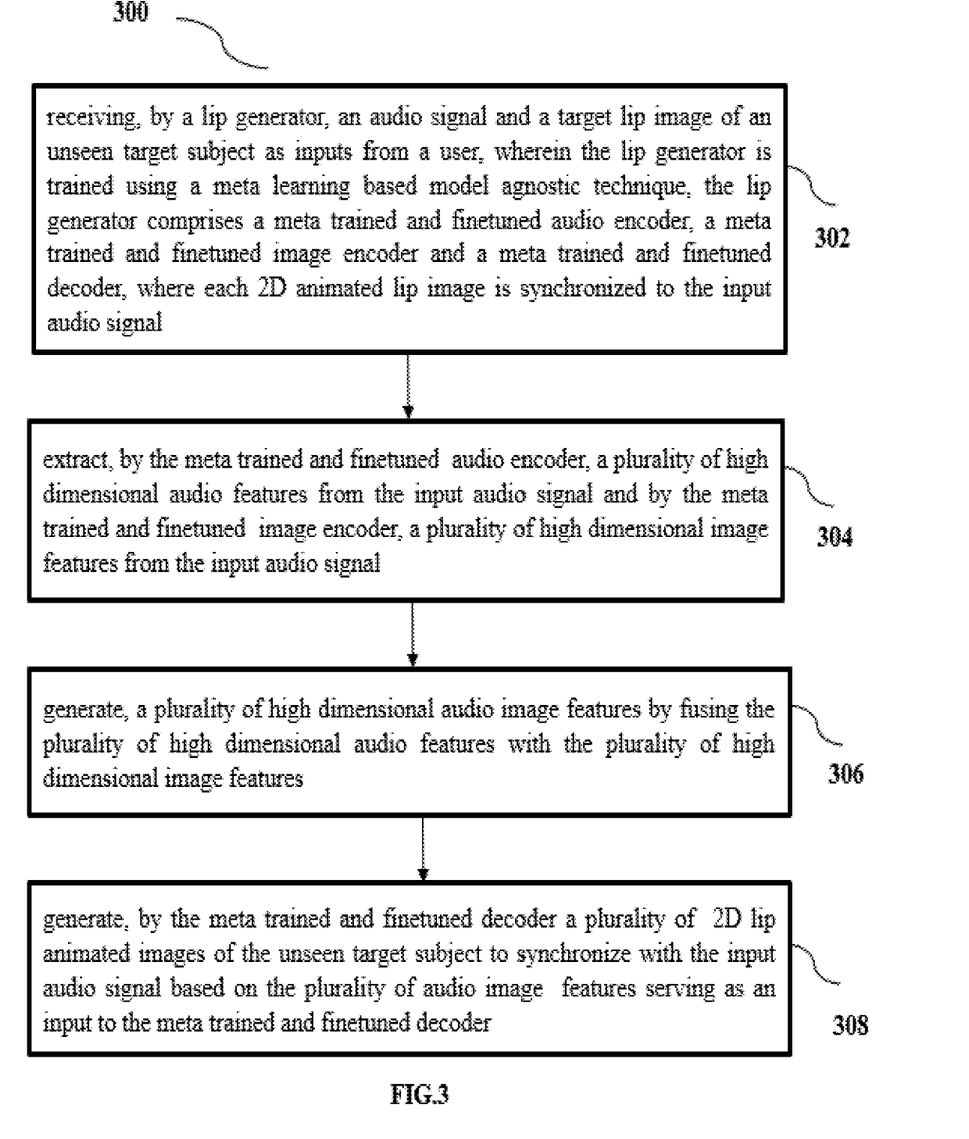
FIG. 3 is a flow diagram illustrating a method for generating 2D animated lip images synchronizing to the audio signal using the system of FIG. 1, according to some embodiments of the present disclosure.

FIG. 3 is a flow diagram illustrating a method for generating 2D animated lip images synchronizing to the audio signal using the system 100 of FIG. 1, according to some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 to receive by a lip generator system, an audio signal and a target lip image of an unseen target subject as inputs from a user. The lip generator system is trained using a meta learning based model agnostic technique, where each 2D animated lip image is synchronized to the input audio signal. Here, the received audio signal is represented by a set of n audio windows, $A_a = \{A_a^0, \ldots A_a^{n-1}\}$ and the target lip image is represented as $A_i$. The lip generator system processes the received audio signal and the target lip image for generating 2D animated lip images depicted as $A_i = \{\hat{A}_i^0, \ldots \hat{A}_i^{n-1}\}$ synchronizing with the audio signal. The lip generator system includes two encoders for extracting feature representation from two modalities such as audio features and image features.

Figure 4:
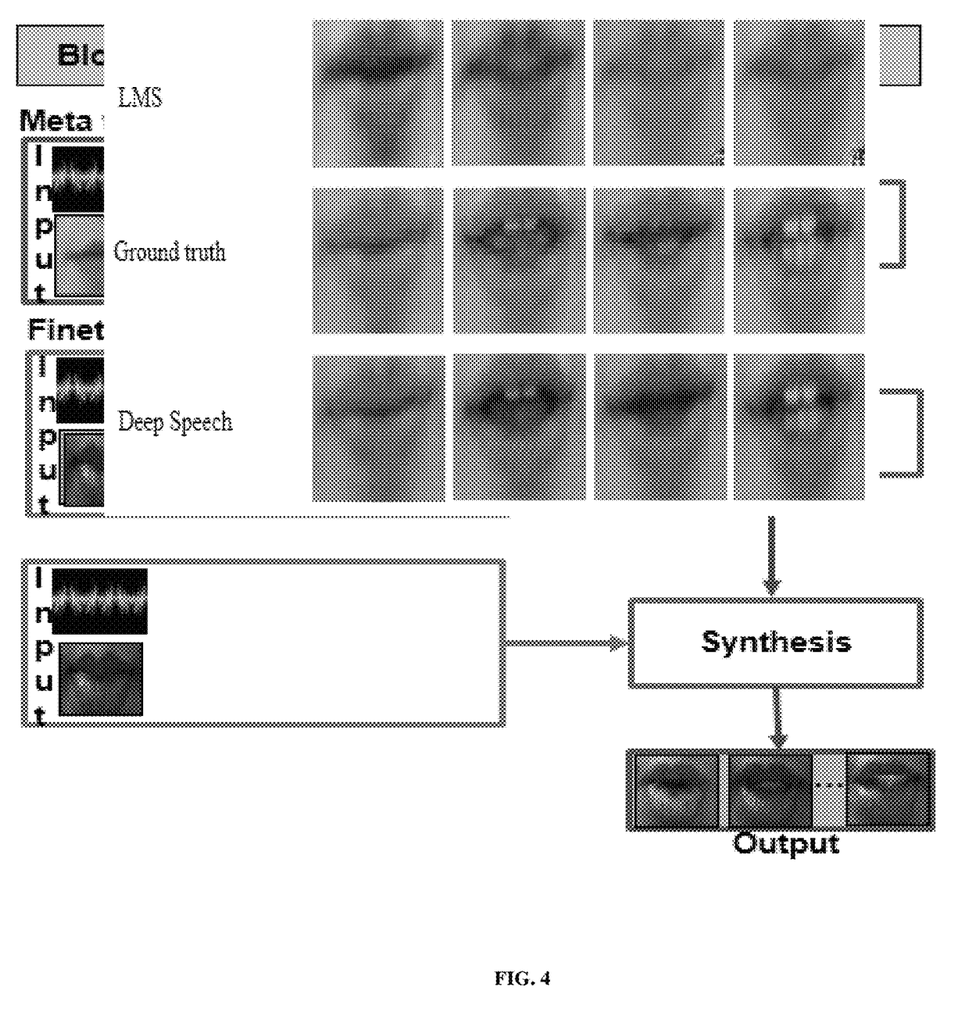
FIG. 4 illustrates three phases of meta learning model based on the model agnostic technique implemented for the lip generator system, according to some embodiments of the present disclosure.
Figure 7:
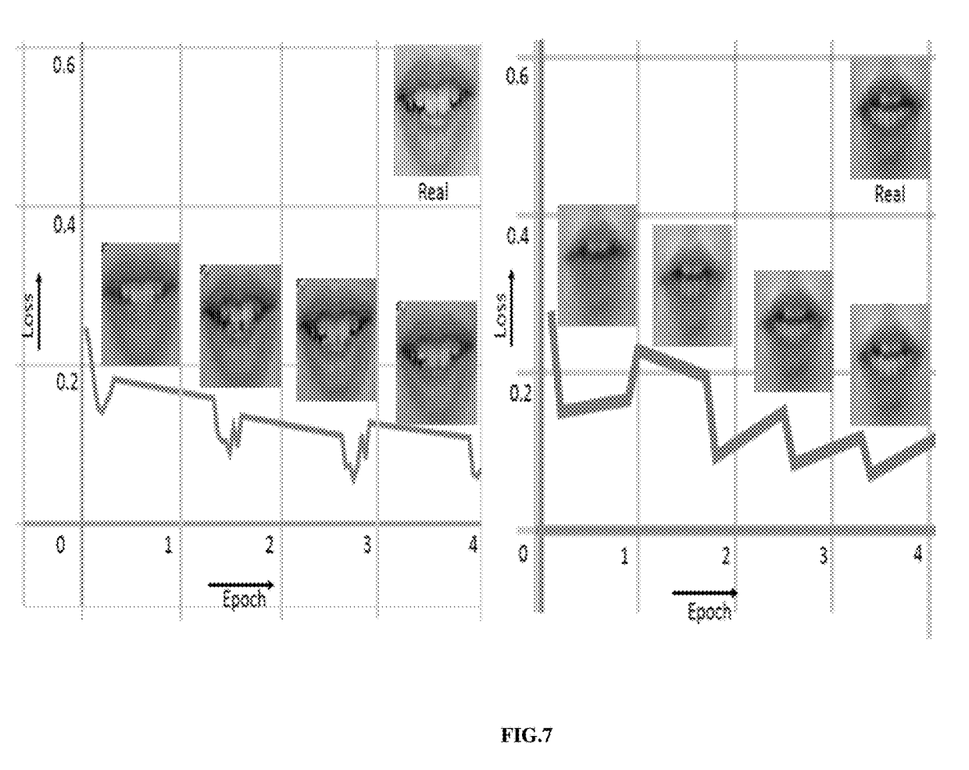
FIG. 7 illustrates graphical representation of generated loss and corresponding improvement of 2D animated lip images synchronized for the audio signal for cross-dataset trained models, according to some embodiments of the present disclosure.

Referring now to FIG. 4, FIG. 4 illustrates three phases of meta learning model based on the model agnostic technique implemented for the lip generator system, according to some embodiments of the present disclosure. Training the lip generator system using the meta learning based model agnostic technique comprises of two phases such as meta training and finetuning. In the meta training phase, the system 100 obtains a training dataset comprising a plurality of data. Each data constitutes a subject's lip image and the audio signal as input and the corresponding subject's sequence of lip images synchronized to the input audio signal as output. Here, the data from the plurality of data is splitted into a plurality of episodes. Each episode consists of 't' number of tasks and each task corresponds to one subject. Each task is split into a set consisting of a predefined number of training data samples corresponding to that subject and a set consisting of a predefined number of test data samples corresponding to same subject. Here, the task is defined as $T = (A_i^1, \ldots A_{lms}^1) \ldots (A_i^{trn+qry}, \ldots A_{lms}^{trn+qry})$, where 'T' refers the task corresponding to the subject and trn, qry are the number of training and test data samples per task. Further, the method initializes a one or more fast weights (also refer as fast weight(s) and interchangeably used herein) and a global weights (also refer as global weight(s) and interchangeably used herein), wherein the features corresponding to each individual subject are learnt using the one or more fast weights. The one or more global weights are updated based on the one or more fast weights for global representation of the one or more features for the training dataset corresponding to all the subjects. Referring now to FIG. 3 and FIG. 7. The loss is represented as $l^i$, i=1, ... t for each of t tasks in the episode. For each task of any episode perform the steps of:

Step 1: copying, the one or more global weights into the one or more fast weights,     Step 2: updating, the one or more fast weights using a gradient descent technique on training dataset samples corresponding to one randomly selected task among the plurality of tasks, and     Step 3: determining, the loss corresponding to the test data samples of the task with respect to the one or more fast weights, wherein the loss is represented as $l^i$, =1, ..., t.

Further, the one or more global weights are updated based on the loss accumulated over all the tasks in one episode. In the finetuning (or fine-tuning and interchangeably used herein) phase, the lip generator system is updated with few samples of the unseen subject. This enables the lip generator system to learn the target subject's intrinsic features. The meta trained model is finetuned for a predefined interval of time using a predetermined number of training data samples corresponding to the unseen target subject. The predefined interval of time is of about 180 seconds. This way, the method further comprising protects a plurality of intrinsic features of the plurality of 2D animated lip images of the unseen target subject, wherein the plurality of intrinsic features for the unseen target subject includes skin color, shape of lip, and sharpness of lip, and the like.

In another embodiment, the pixel level reconstruction loss is represented between the plurality of 2D animated lip images $\hat{v}$ and the original video v as given below in equation 1, $$L_{pix}(v, \hat{v}) = \|v - \hat{v}\|_2^2 \qquad \text{equation (1)}$$

Due to the pixel level reconstruction loss the generated lip images retain the texture of the target subject image but reduce the sharpness of the synthesized video frames. To obtain the perceptual loss a new auto-encoder is trained that reconstructs the video clips. The Perceptual loss is defined as specified below in equation (2), $$L_{per}(v, \hat{v}) = \|\tau(v) \times \tau(\hat{v})\|_2^2 \qquad \text{equation (2)}$$

where $\tau(v)$ is the encoder part of the pre-trained autoencoder. The objective is to minimizes the composite loss as given in equation (3), $$L = \alpha_1 L_{pix} + \alpha_2 L_{per}, \alpha_1 + \alpha_2 = 1 \qquad \text{equation (3)}.$$

Referring now to the steps of the method 300, at step 304, the one or more hardware processors 104 to extract, by the meta trained and finetuned audio encoder a plurality of high dimensional audio features from the input audio signal. Referring now to FIG. 2 and FIG. 4, the convolutional audio encoder performs extracting the plurality of high dimensional features to generate the 2D animated lip images. Considering the above inputs received, the audio signal $A_a$ is processed for extraction of the plurality of high dimensional audio features for representing the contents of the audio signal. The audio signal is further encoded into Mel-Frequency cepstral coefficients $A_{lms}$ which are served as an input to the trained Deep Speech (DS) network is utilized. We use the output of the last but one layer of the DS network. These features (denoted as $A_{DS}$) are used as input to the meta learning and finetuned audio encoder comprised in the system 100. The meta learned and finetuned audio encoder $\theta_a$ extracts the plurality of high dimensional audio features $f_a$.

Referring now to the steps of the method 300, at step 306, the one or more hardware processors 104 to extract a plurality of high dimensional image features from the target lip image using the meta trained and finetuned image encoder. The input target lip image $A_t$ is encoded using the meta trained and finetuned image encoder $\theta_i$ to extract the plurality of high dimensional image features $f_i$. Here, the audio image fusion of the lip generator system fuses the plurality of high dimensional audio features $f_a$ extracted from the meta trained and finetuned audio encoder with the plurality of high dimensional image features $f_i$ extracted from the meta trained and finetuned image encoder to generate the plurality of high dimensional audio image features $f_v$.

Referring now to the steps of the method 300, at step 308, the one or more hardware processors 104 generate via the meta trained and finetuned decoder a plurality of 2D animated lip images of the unseen target subject to synchronize with the audio signal based on the plurality of high dimensional audio image features serving as an input to the meta trained and finetuned decoder. The plurality of high dimensional audio image features are processed by the meta trained and finetuned decoder to generate the plurality of 2D animated lip images $\hat{v}=\theta_g(f_v)$, where $\theta_g$ is the meta trained and finetuned decoder of the lip generator system. The lip generator system trained using the meta learning based model agnostic technique has two types of training datasets that includes a GRID dataset and a TCD-TIMIT dataset. The available training datasets are compared with the present disclosure, where the GRID dataset consists of 33 subjects each having 1000 videos. In each video, the subject utters a small sentence. The present disclosure is evaluated using the TCD-TIMIT dataset. The TCD-TIMIT dataset includes all white subjects. Therefore, to increase the variety of the subjects' ethnicity, a new dataset is created named as LVoc. The TCD-TIMIT dataset includes all white subjects to increase the variety of the subjects' ethnicity, where a new training dataset is created as LVoc. The LVoc dataset consists of videos where each subject of the 28 subjects utters the subset of sentences taken from TCD-TIMIT dataset. The LVoc consists of 300 sentences that are randomly selected from the 6300 sentences of the TCD-TIMIT dataset. The audio signal of the GRID dataset are sampled at 44.1 KHz with frame rate of about 25, the TCD-TIMIT dataset are sampled at 48 KHz (Kilo Hertz) with frame rate of about 30 and the LVoc dataset are sampled at 48 KHz (Kilo Hertz) with frame rate of about 30. Further, all the audio signals are transformed into 16 KHz (Kilo Hertz) before using as input to the deep speech network. The GRID dataset has 900 videos selected from the random subjects of the GRID dataset. The grid search is performed to find the minimum number of samples that are enough for finetuning and generating realistic looking 2D animated lip images. Further, finetuning is performed with 10 samples and for meta learning and finetuning a training sample consists of the audio segment, a randomly chosen image of the target and the sequence of images corresponding to the audio segment. Further, from each video, the image sequence is sampled at a window length of 16 images with a stride of 8 images. Consider a 25 fps video (e.g., GRID dataset) where each target image consists of 0.04 seconds and each sample of image sequence and the corresponding audio signal is of length 0.64 seconds. The dlib is used for extraction of lips from the face images. Each lip image is resized to 64*64 pixels. The audio signal is encoded into Mel frequency cepstral coefficients and used as input to the deep speech network (comprised in the system 100—not shown in FIGS.). The number of Mel bands, the FFT window length and the number of samples between successive frames are 128, 1024 and 512. The Adam optimizer (comprised in the system 100—not shown in FIGS.) with learning rate for the one or more global weights is 0.001 and the one or more fast weights is 0.01.

Figures 5A, 5B:
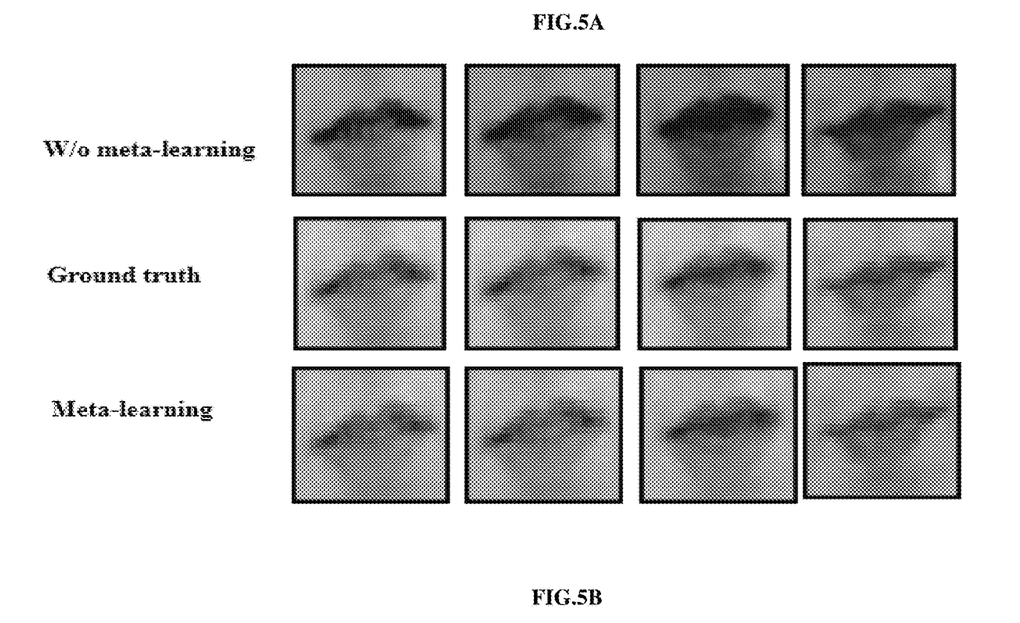
FIG. 5A illustrates 2D animated lip images when deep speech features are used as input audio features in comparison with Log-amplitude Mel-frequency Spectrum (LMS) features, according to some embodiments of the present disclosure.
FIG. 5B illustrates 2D animated lip images generated with the lip generator system when trained with meta learning based approach in comparison with non-meta learning based gradient descent approach, according to some embodiments of the present disclosure.

FIG. 5A illustrates 2D animated lip images when deep speech features are used as input audio features in comparison with Log-amplitude Mel-frequency Spectrum (LMS) features, according to some embodiments of the present disclosure. More specifically, FIG. 5A depicts comparison of 2D animated lip images generated synchronizing the audio signal represented as deep speech features and Log-amplitude Mel-frequency Spectrum (LMS) features. The lip generator system trained with deep speech features generate 2D animated lip images with reduced time and converge faster as compared to lip generator system trained with Log-amplitude Mel-frequency Spectrum (LMS) features. The deep speech features encode the features for fast convergence of the lip generator system.

FIG. 5B illustrates 2D animated lip images generated with the lip generator system when trained with meta learning based approach in comparison with non-meta learning based gradient descent approach, according to some embodiments of the present disclosure. More specifically, FIG. 5B depicts 2D animated lip images driven by the audio signal representing the plurality of high dimensional audio features with proper 2D animated features. This lip generator system trained with meta learning provides better intrinsic features of the target subject such as the skin color, the shape of lip and the sharpness of lip as compared to non meta learned lip generator system.

Figure 6:
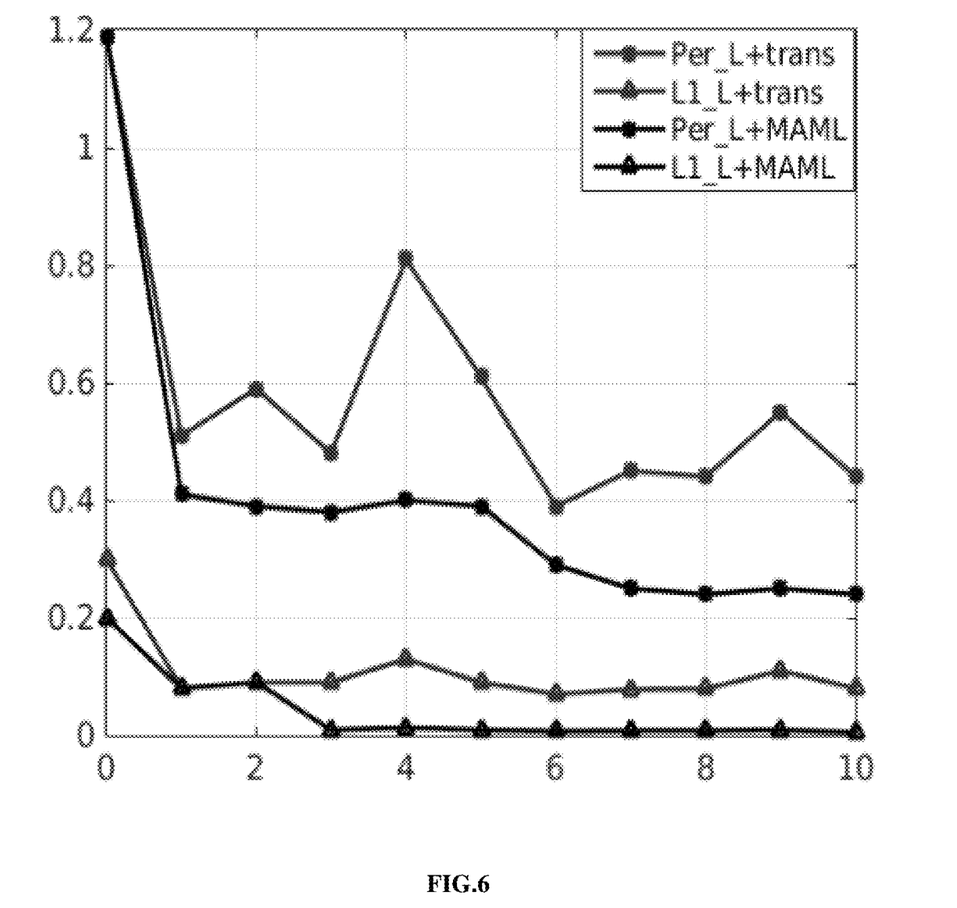
FIG. 6 illustrates graphical representation of loss generated for meta learning model with increasing epochs in comparison with transfer learning loss, according to some embodiments of the present disclosure.

FIG. 6 illustrates graphical representation of loss generated for meta learning model with increasing epochs in comparison with transfer learning loss, according to some embodiments of the present disclosure. The graph depicts results of meta learning based model agnostic technique with increasing epochs. The lip generator system is trained and tested with the GRID dataset. The test subjects are not included in the training. Transfer learning is utilized on the base model using the 10 samples of the target subject. The loss for meta learning is less per epoch as compared to loss for transfer learning.

Figure 8:
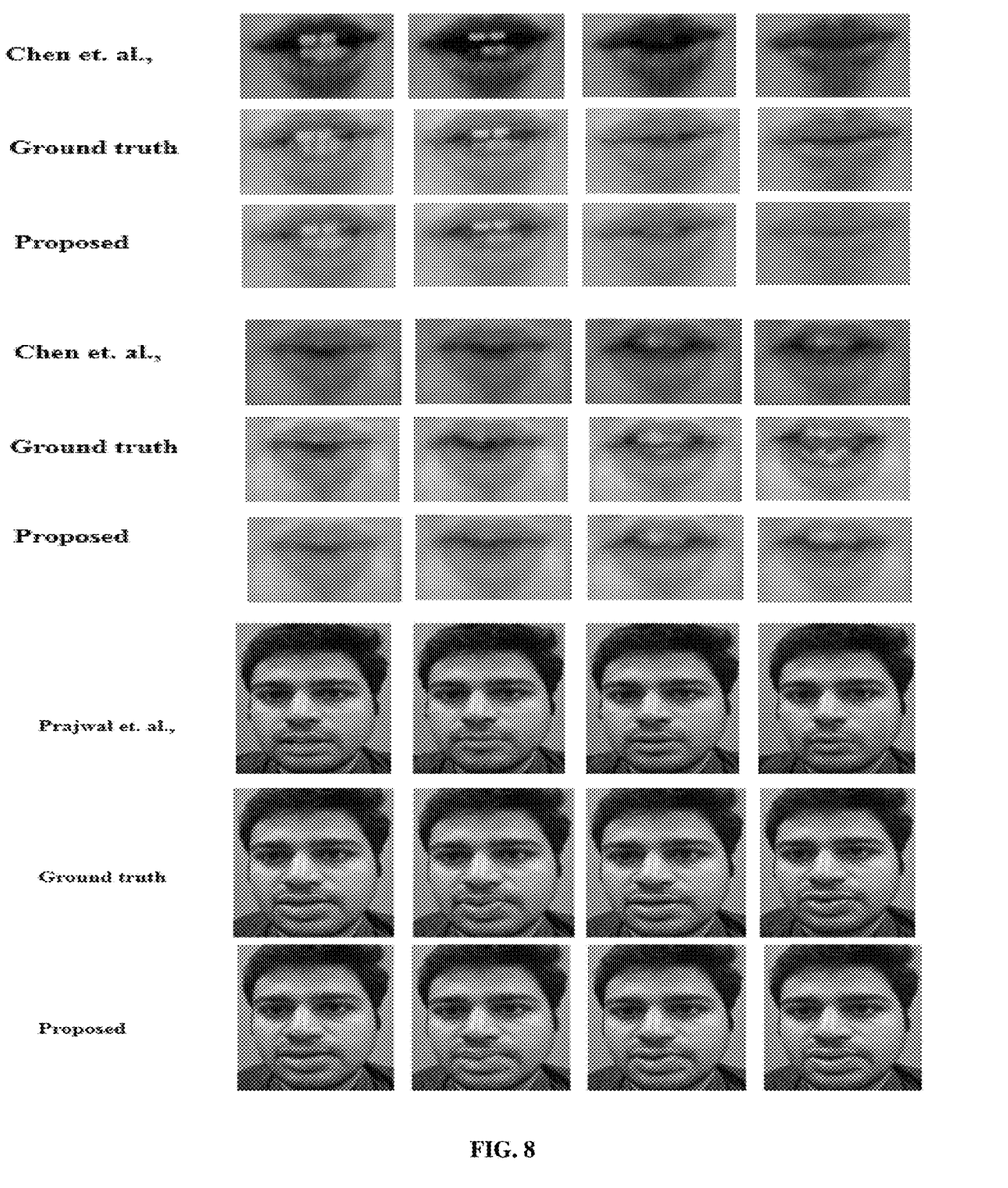
FIG. 8 illustrates graphical representation of generated 2D animated lip images using the system of FIG. 1 in comparison with state of the art methods, according to some embodiments of the present disclosure.

FIG. 8 illustrates graphical representation of generated 2D animated lip images using the system of FIG. 1 generated using the method of the present disclosure in comparison with state of the art methods, according to some embodiments of the present disclosure. The lip generator system of the present disclosure are trained and tested with GRID dataset and the intrinsic features of the model such as the skin color, the shape of lip and the sharpness of lip is preserved and results better in comparison with the existing State-Of-the-Art (SOA) models. The present disclosures lip generator system is compared with the existing prior arts approaches, where the 2D animated lip images are driven by the audio signal and the target lip image for the unseen subject. Table 1 provides quantitative comparison of the lip generator system with the existing prior arts providing PSNR, SSIM, L1 loss and LMD results.

TABLE 1

Quantitative Comparison of the lip generator system with the existing prior arts

|  | PSNR | SSIM | L1 loss | LMD |
|---|---|---|---|---|
| Chen et al (prior art) | 27.50 | 0.73 | 1.58 | 2.10 |
| KR et al (prior art) | 33.40 | 0.96 | — | 0.6 |
| Lip generator (present disclosure) | 31.3 | 0.98 | 1.24 | 1.20 |

The lip generator system has been trained and tested with GRID dataset and the test dataset subject is not included in the training dataset. The present disclosure provides better LMD and signifies better animation capability. This method provides better PSNR and preserves intrinsic features such as skin color and lip shape.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem generating realistic animated lip images on unseen target subject. The embodiment thus provides a method and system for generating 2D animated lip images synchronizing to an audio signal. The present disclosure provides efficiently generated animated lip images using the lip generator system rendering on arbitrary faces after being finetuned for a predefined interval time of about 180 seconds using a predetermined number of samples of the unseen subject. The lip generator system is trained using the meta learning based model agnostic technique which also enables protecting the intrinsic features of the lip image that includes the skin color, the shape of lip, and the sharpness of lip. The lip generator system provides better encoding for generating 2D animated lip images synchronizing with the audio signal based on deep speech features for providing better animation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method to generate 2D animated lip images synchronizing to an audio signal of an unseen target subject, the method comprising:

receiving, via one or more hardware processors, by a lip generator system, an audio signal and a target lip image of an unseen target subject as inputs from a user, wherein the lip generator system is trained using a meta learning based model agnostic technique, wherein the lip generator system comprises a meta trained and finetuned audio encoder, a meta trained and finetuned image encoder, and a meta trained and finetuned decoder, wherein each 2D animated lip image is synchronized to the input audio signal, wherein training the lip generator system using the meta learning based model agnostic technique further comprises:

performing meta learning on a training dataset comprising a plurality of data, wherein each data of the plurality of data comprises a subject's lip image and an audio signal as input and the corresponding subject's sequence of lip images synchronized to the input audio signal as output, wherein each training dataset is split into a plurality of episodes;

iteratively, performing for every episode of the plurality of episodes:
(i) splitting, each episode into a predefined number of tasks among a plurality of tasks, wherein each task comprises a predefined number of training data samples and a predefined number of test data samples corresponding to one subject;
(ii) initializing one or more fast weights and one or more global weights, wherein the one or more features corresponding to each individual subject are learnt using the one or more fast weights, wherein the one or more global weights are updated based on the fast weights for global representation of the one or more features for the training dataset corresponding to all the subjects;
(iii) iteratively performing for every task from the plurality of tasks of the current episode, comprises:
a) copying, the one or more global weights into the one or more fast weights;
b) updating, the one or more fast weights using a gradient descent technique for training data samples corresponding to the selected task among the plurality of tasks; and
c) determining, the loss on the test data samples corresponding to the subject of the task based on the one or more fast weights; and
(iv) updating, the one or more global weights based on the loss accumulated based on the plurality of tasks in the current episode;

extracting, via the one or more hardware processors, by the meta trained and finetuned audio encoder, a plurality of high dimensional audio features from the input audio signal, and extracting, by the meta trained and finetuned image encoder, a plurality of high dimensional image features from the target lip image;

generating, via the one or more hardware processors, a plurality of high dimensional audio image features based on the plurality of high dimensional audio features with the plurality of high dimensional image features; and generating, by the meta trained and finetuned decoder via the one or more hardware processors, a plurality of 2D animated lip images of the unseen target subject to synchronize with the input audio signal based on the plurality of high dimensional audio image features serving as an input to the meta trained and finetuned decoder.

2. The method as claimed in claim 1, wherein the meta learning based model agnostic technique is finetuned for a predefined interval of time arbitrarily using a predetermined number of training data samples corresponding to the unseen target subject.

3. The method as claimed in claim 1, further comprising protecting a plurality of intrinsic features of the plurality of 2D animated lip images of the unseen target subject, wherein the plurality of intrinsic features of the unseen target subject includes skin color, shape of lip, and sharpness of lip.

4. A lip generator system, to generate 2D animated lip images synchronizing to an audio signal of an unseen target subject, comprising:

a memory storing instructions;
one or more communication interfaces; and
one or more hardware processors coupled to the memory via the one or more communication interfaces, wherein the one or more hardware processors are configured by the instructions to:

receive, by a lip generator system, an audio signal and a target lip image of an unseen target subject as inputs from a user, wherein the lip generator system is trained using a meta learning based model agnostic technique, wherein the lip generator system comprises a meta trained and finetuned audio encoder, a meta trained and finetuned image encoder and a meta trained and finetuned decoder, wherein each 2D animated lip image is synchronized to the input audio signal, and train the lip generator system using the meta learning based model agnostic technique to:

perform meta learning on a training dataset comprising a plurality of data, wherein each data of the plurality of data comprises a subject's lip image and an audio signal as input and the corresponding subject's sequence of lip images synchronized to the input audio signal as output, wherein each training dataset is split into a plurality of episodes;

iteratively, perform for every episode of the plurality of episodes:
(i) split, each episode into a predefined number of tasks among a plurality of tasks, wherein each task comprises a predefined number of training data samples and a predefined number of test data samples corresponding to one subject;
(ii) initialize one or more fast weights and one or more global weights, wherein the one or more features corresponding to each individual subject are learnt using the one or more fast weights, wherein the one or more global weights are updated based on the fast weights for global representation of the one or more features for the training dataset corresponding to all the subjects;
(iii) iteratively perform for every task from the plurality of tasks of the current episode, comprises:
a) copying, the one or more global weights into the one t weights;
b) updating, the one or more fast weights using a gradient descent technique for training data samples corresponding to the selected task among the plurality of tasks; and c) determining, the loss on the test data samples corresponding to the subject of the task based on the one or more fast weights; and (iv) updating, the one or more global weights based on the loss accumulated based on the plurality of tasks in the current episode;

extract, by the meta trained and finetuned audio encoder, a plurality of high dimensional audio features from the input audio signal, and extract, by the meta trained and finetuned image encoder, a plurality of high dimensional image features from the target lip image;

generate, a plurality of high dimensional audio image features based on by fusing the plurality of high dimensional audio features with the plurality of high dimensional image features; and generate, by the meta trained and finetuned decoder, a plurality of 2D animated lip images of the unseen target subject to synchronize with the input audio signal based on the plurality of high dimensional audio image features serving as an input to the meta trained and finetuned decoder.

5. The system as claimed in claim 4, wherein the meta learning based model agnostic technique is finetuned for a predefined interval of time arbitrarily using a predetermined number of training dataset samples corresponding to the unseen target subject.

6. The system as claimed in claim 4, further comprising protecting a plurality of intrinsic features of the plurality of 2D animated lip images of the unseen target subject, wherein the plurality of intrinsic features of the unseen target subject includes skin color, shape of lip, and sharpness of lip.

7. One or more non-transitory machine-readable information storage mediums comprising one or more instructions which when executed by one or more hardware processors perform actions comprising:

receive, by a lip generator system, an audio signal and a target lip image of an unseen target subject as inputs from a user, wherein the lip generator system is trained using a meta learning based model agnostic technique, wherein the lip generator system comprises a meta trained and finetuned audio encoder, a meta trained and finetuned image encoder and a meta trained and finetuned decoder, wherein each 2D animated lip image is synchronized to the input audio signal, wherein training the lip generator system using the meta learning based model agnostic technique further comprises:

performing meta learning on a training dataset comprising a plurality of data, wherein each data of the plurality of data comprises a subject's lip image and an audio signal as input and the corresponding subject's sequence of lip images synchronized to the input audio signal as output, wherein each training dataset is split into a plurality of episodes;

iteratively, performing for every episode of the plurality of episodes:

(i) splitting, each episode into a predefined number of tasks among a plurality of tasks, wherein each task comprises a predefined number of training data samples and a predefined number of test data samples corresponding to one subject;

(ii) initializing one or more fast weights and one or more global weights, wherein the one or more features corresponding to each individual subject are learnt using the one or more fast weights, wherein the one or more global weights are updated based on the fast weights for global representation of the one or more features for the training dataset corresponding to all the subjects;

(iii) iteratively performing for every task from the plurality of tasks of the current episode, comprises:

a) copying, the one or more global weights into the one or more fast weights;

b) updating, the one or more fast weights using a gradient descent technique for training data samples corresponding to the selected task among the plurality of tasks; and c) determining, the loss on the test data samples corresponding to the subject of the task based on the one or more fast weights; and (iv) updating, the one or more global weights based on the loss accumulated based on the plurality of tasks in the current episode;

extract by the meta trained and finetuned audio encoder a plurality of high dimensional audio features from the input audio signal, and extracting, by the meta trained and finetuned image encoder, a plurality of high dimensional image features from the target lip image; generate a plurality of high dimensional audio image features based on the plurality of high dimensional audio features with the plurality of high dimensional image features; and generate, by the meta trained and finetuned decoder, a plurality of 2D animated lip images of the unseen target subject to synchronize with the input audio signal based on the plurality of high dimensional audio image features serving as an input to the meta trained and finetuned decoder.

8. The one or more non-transitory machine-readable information storage mediums of claim 7, wherein the meta learning based model agnostic technique is finetuned for a predefined interval of time arbitrarily using a predetermined number of training dataset samples corresponding to the unseen target subject.

9. The one or more non-transitory machine-readable information storage mediums of claim 7, further comprising protecting a plurality of intrinsic features of the plurality of 2D animated lip images of the unseen target subject, wherein the plurality of intrinsic features of the unseen target subject includes skin color, shape of lip, and sharpness of lip.

* * * * *